(12) United States Patent
Pai

(10) Patent No.: US 9,152,319 B2
(45) Date of Patent: Oct. 6, 2015

(54) METHOD FOR SIMPLIFYING A SWYPE BASED TOUCH-SCREEN KEYPAD FOR FAST TEXT ENTRY

(75) Inventor: Deep Subhash Pai, Pune (IN)

(73) Assignee: AVAYA INC., Basking Ridge, NJ (US)

( * ) Notice: Subject to any disclaimer, the term of this patent is extended or adjusted under 35 U.S.C. 154(b) by 184 days.

(21) Appl. No.: 13/549,654

(22) Filed: Jul. 16, 2012

(65) Prior Publication Data

US 2014/0015753 A1    Jan. 16, 2014

(51) Int. Cl.
*G06F 3/041* (2006.01)
*G06F 3/0488* (2013.01)

(52) U.S. Cl.
CPC .................. *G06F 3/04883* (2013.01)

(58) Field of Classification Search
CPC ..................................................... G06F 3/041
USPC .......... 345/168, 172, 173, 689; 715/773, 261, 715/750, 835, 816
See application file for complete search history.

(56) References Cited

U.S. PATENT DOCUMENTS

| | | | | | |
|---|---|---|---|---|---|
| 5,881,169 | A | * | 3/1999 | Henry, Jr. ........................ | 382/187 |
| 5,953,541 | A | * | 9/1999 | King et al. ....................... | 710/67 |
| 6,002,390 | A | * | 12/1999 | Masui ............................. | 345/173 |
| 7,453,439 | B1 | * | 11/2008 | Kushler et al. ................. | 345/168 |
| 2006/0152496 | A1 | * | 7/2006 | Knaven ........................... | 345/172 |
| 2011/0078613 | A1 | * | 3/2011 | Bangalore ....................... | 715/773 |
| 2012/0056829 | A1 | * | 3/2012 | Kasahara et al. .............. | 345/173 |
| 2012/0256858 | A1 | * | 10/2012 | Sudo .............................. | 345/173 |
| 2013/0125034 | A1 | * | 5/2013 | Griffin et al. .................. | 715/773 |
| 2013/0176228 | A1 | * | 7/2013 | Griffin et al. .................. | 345/168 |
| 2013/0314352 | A1 | * | 11/2013 | Zhai et al. ...................... | 345/173 |

* cited by examiner

*Primary Examiner* — Olga Merkoulova
(74) *Attorney, Agent, or Firm* — Anderson Gorecki & Rouille LLP

(57) ABSTRACT

A method, apparatus and computer program product for entering text on a touch-screen device is presented. Entry of at least one letter of a word on a virtual keypad of a touch-screen device is detected. In response to the detection of an entry of least one letter of a word on a virtual keypad of a touch-screen device a first row of keys is displayed on the virtual keypad, the first row of keys comprising a predictive character set of keys based on the entry of at least one letter of a word.

18 Claims, 8 Drawing Sheets

METHOD FOR SIMPLIFYING A SWYPE BASED TOUCH-SCREEN KEYPAD FOR FAST TEXT ENTRY

BACKGROUND

Swype is an input method for touch-screens where the user enters words by sliding a finger or stylus from letter to letter, lifting only between words. Swype uses error-correcting algorithms and a language model to guess the intended word. Swype also includes a tapping predictive text system in the same interface. Swype is designed for use on touch-screen devices with a traditional QWERTY keyboard. Swype's underlying technology relies on four major components: an input path analyzer for Swyping, a predictive tap corrective engine for tapping, a word matching search engine with accompanying word database, and a flexible user interface. These four components together with standard features make Swype a viable input solution for virtual keyboard applications. Swype is designed to work across a variety of devices such as phones, tablets, game consoles, kiosks, televisions, virtual screens, and more

SUMMARY

Conventional mechanisms such as those explained above suffer from a variety of deficiencies. It is accordingly an object of the invention to eliminate or alleviate at least some of the problems referred to below.

One deficiency associated with swype text entry is that there are 26 keys or touch points on the virtual keypad that a user has to navigate by swiping to enter a word. Another deficiency is that the position of the keys is fixed and hence the direction of the swipe is unordered based on the word the user wants to enter. Still another deficiency is in order to enter repeating or double characters (e.g. "tt") the user must make a loop on that character. Yet still another deficiency is for small screen devices the above tasks pose challenges due to the small size of the keys on the virtual keypad.

In the presently disclosed method for simplifying a swype based touch-screen keypad for fast text entry, a method to simplify swype to reduce the touch points on the virtual keyboard and introduce an ordering and direction to the swipe actions is presented. The method includes the addition of a set of predictive character keys at the top and bottom of the virtual keypad that change dynamically in content and location based on the text entered by the user.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
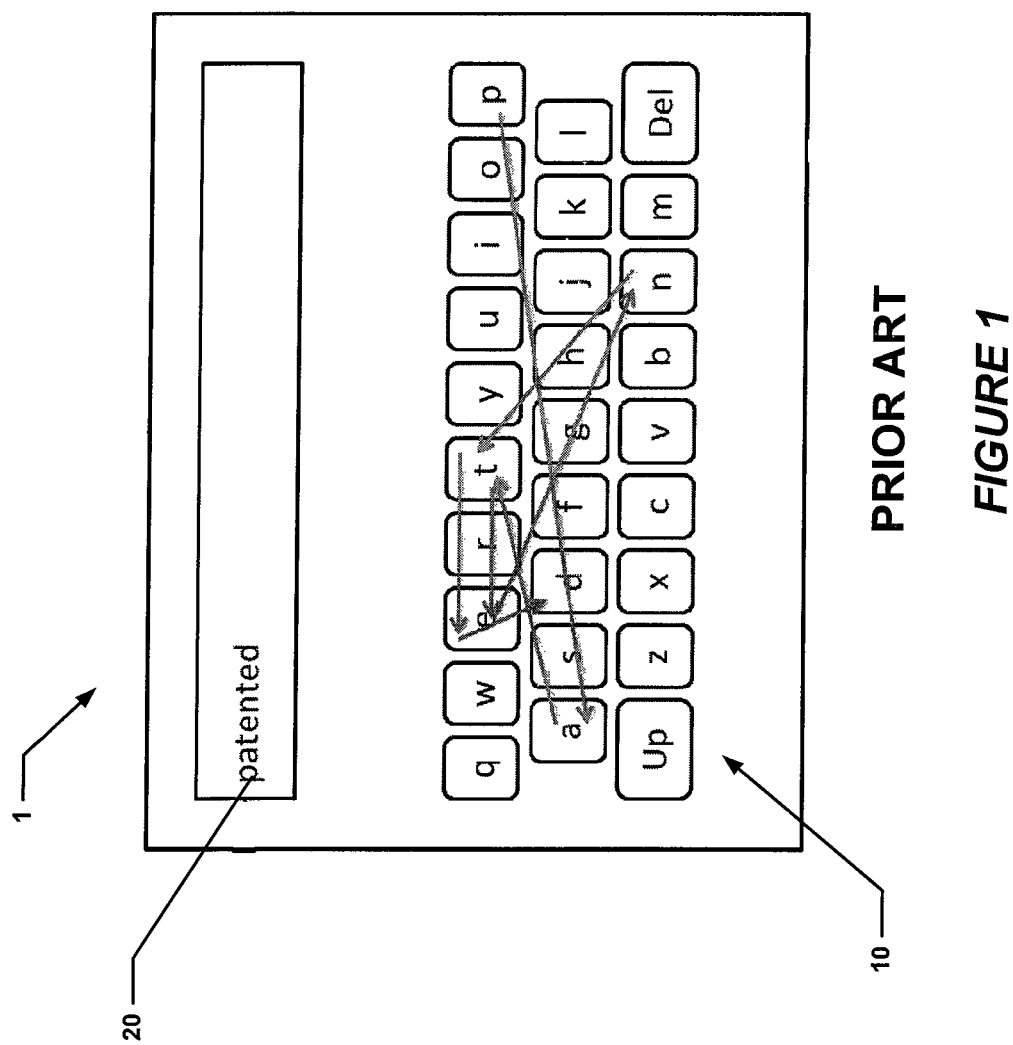
FIG. 1 depicts a prior art virtual keypad and the swype actions required for entering a word.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Referring now to FIG. 1, a prior art entry of the word "patented" is shown on a conventional touch screen virtual keypad. Device 1 includes a virtual keypad 10 and a display for the entered word 20. The word is entered by swiping, starting at the letter "p", then dragging the finger or stylus from "p" to "a", from "a" to "t", from "t" to "e", from "e" to "n", from "n" to "t", from "t" to "e" and from "e" to "d", where the finger or stylus is lifted off the virtual keypad.

Figure 2:
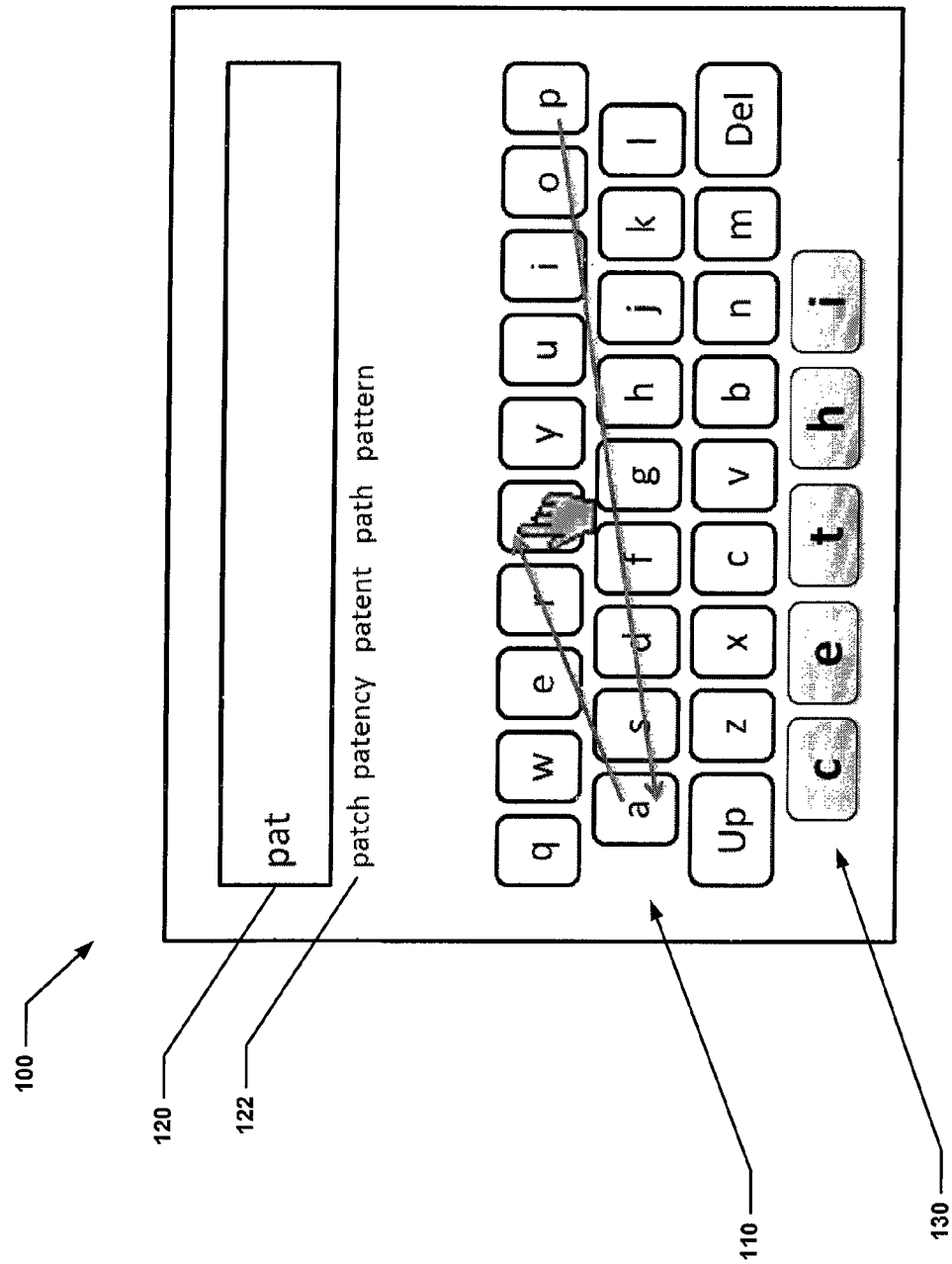
FIG. 2 depicts a virtual keypad and the swype actions required for entering a word wherein a first predictive character set of keys are provided in accordance with embodiments of the invention.

Referring now to FIG. 2, the presently described invention provides for dynamically adding a set of keys at the top and/or bottom of the virtual keypad to simplify the swype method of text input. This new set of keys are referred to herein as the predictive character set. The keys that will be part of this set are based on the next character the user is likely to enter as determined by the predictive text entry system. A typical predictive text entry system will provide a set of words based on the text that is currently entered by the user. Here, system 100 includes a virtual keypad 110, a display for the entered test, 120 and a predictive set of words 122. The user has swyped the letters "pat". As a result, the predicative words are shown as "patch", "patency", "patent", "path", and "pattern" etc. sorted accordingly to their probabilities of their use. A predictive character set of keys 130 are provided below the standard keys of the virtual keypad. Here, the set of next characters that form the predictive character set of keys 130 are {c, e, t, h, and i}. It should be noted that the predictive character set of keys are larger in size than the standard character keys of virtual keypad 110, and accordingly, are easier to view and use. The user swyped "p" then swiped over to "a" then swiped over to "t". Since the last letter swyped was in the top row of keys of virtual keypad 110, the predictive set of keys 130 are displayed below the lowest row of keys of virtual keypad 110. This is done to allow the user an easily performed downward swipe, in a top-to-bottom type action for entering the next character. It should be noted that the keys of virtual keypad 110 are still active, thus for the next letter ("e") the user can swype down to the "e" on the predictive character set of keys 130 or swype over to "e" on virtual keypad 110. In the event the next letter to be entered is not displayed on the predictive character set of keys 130, the user can swipe the next character on the virtual keypad 110.

The location and order of the keys of the predictive character set of keys follow the following two rules. The location of the predictive character set of keys will be opposite the last swiped key. For example, if the last key swiped was at the top of the keypad then the next set of predicted characters keys will be shown at the bottom of the keypad and vice-versa. Keys that belong to the right side of the virtual keypad (as based on the standard QWERTY layout) will appear to the right in the predictive character set of keys, and the ones that belong to the left side of the virtual keypad will appear to the left in the set of predicted characters keys.

Figure 3:
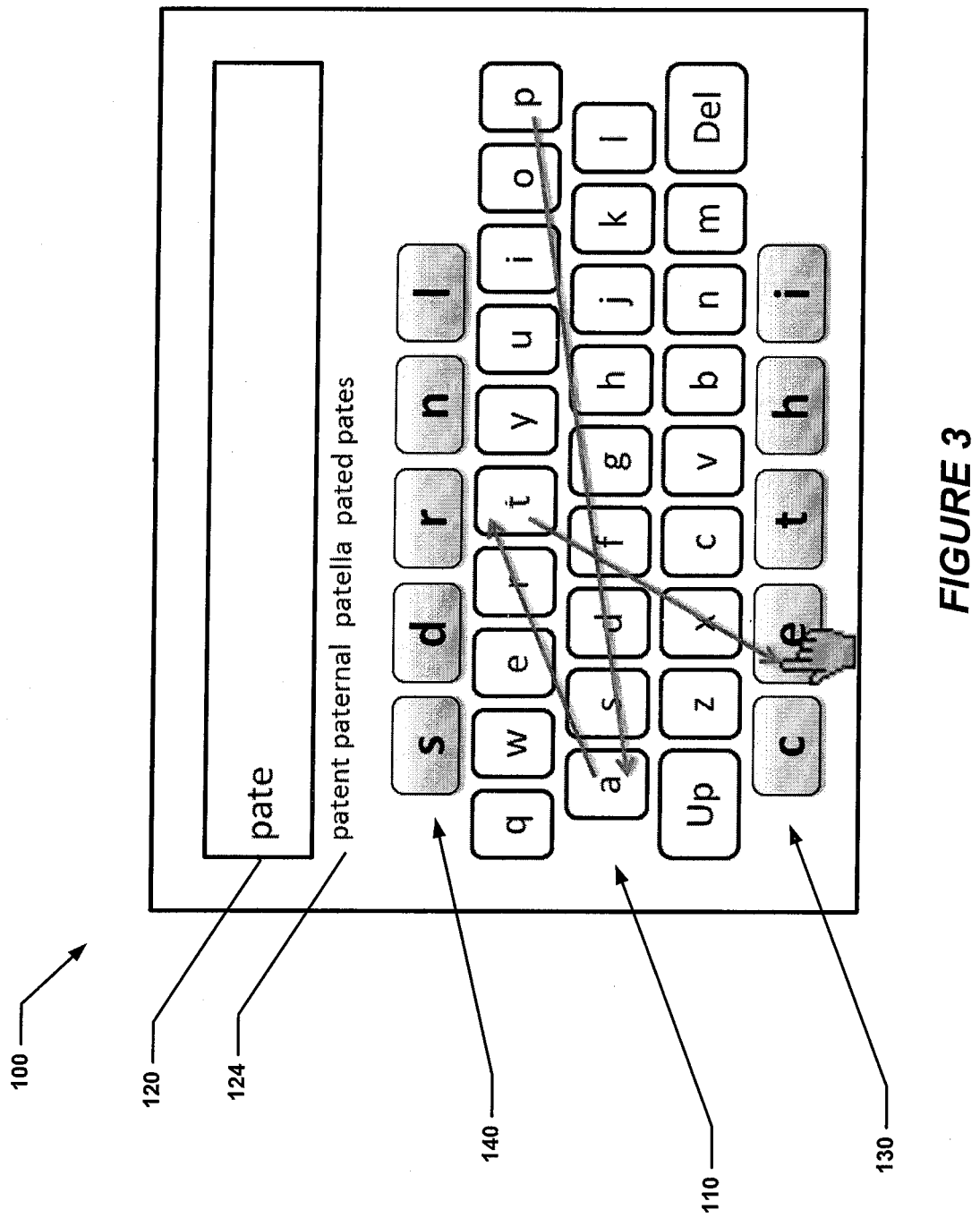
FIG. 3 depicts a virtual keypad and the swype actions required for entering a word wherein a second predictive character set of keys are provided in accordance with embodiments of the invention.

Referring now to FIG. 3, the user has just swiped from "t" of virtual keypad 110 to "e" of predictive character keys 130. The display of user entered text 120 reflects the letters "pate" and the predictive text shows the words: patent, paternal, patella, pated and pates. A new predictive character set of keys 140 is displayed above the virtual keypad 110. This new predictive character set of keys include the letters "s", "d", "r", "n" and "l".

Figure 4:
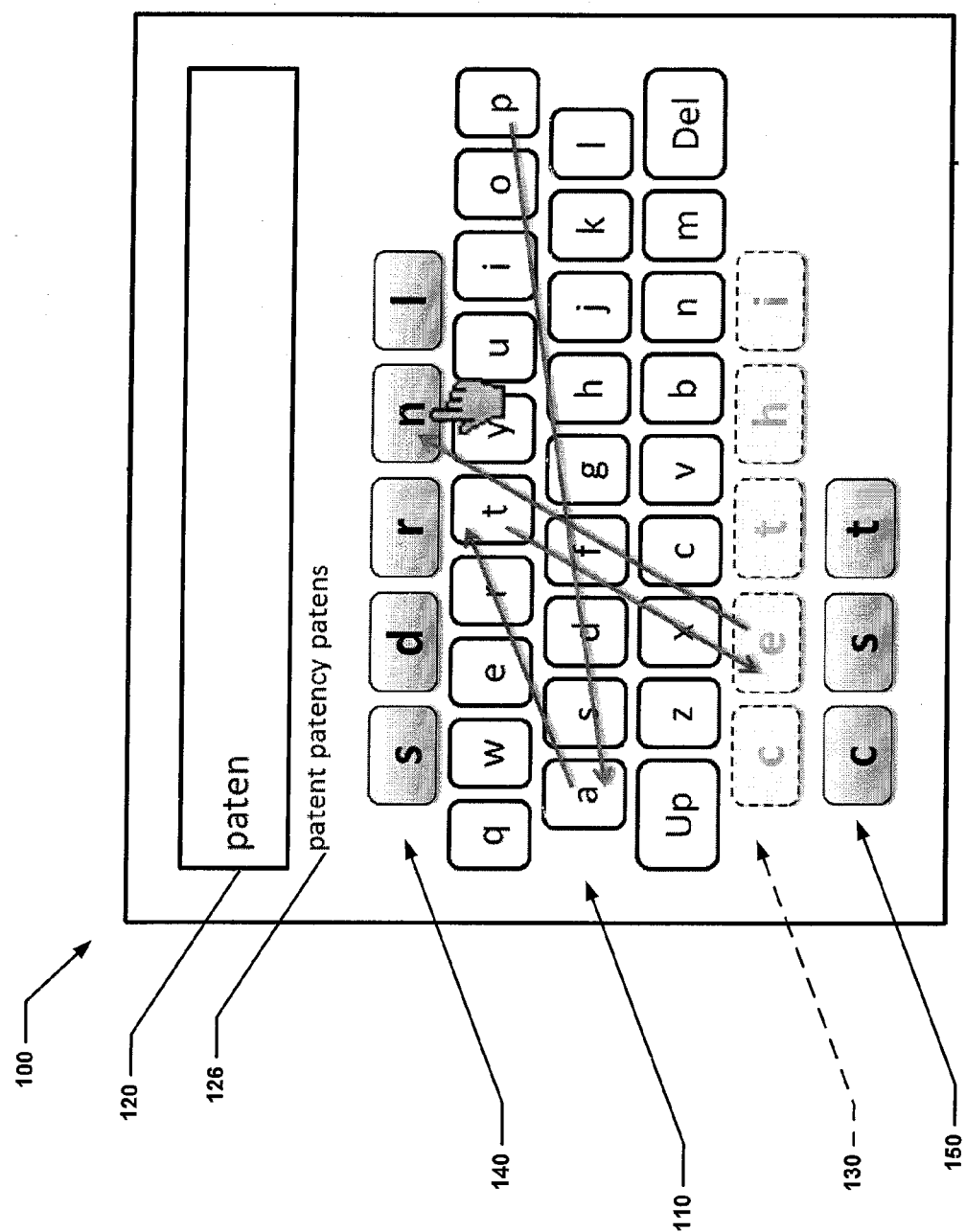
FIG. 4 depicts a virtual keypad and the swype actions required for entering a word wherein a third predictive character set of keys which replace a first predictive character set of keys are provided in accordance with embodiments of the invention.

Referring now to FIG. 4, the user has just swiped from "e" of predictive character key to "n" of the new predictive character keys 140. The display of user entered text 120 reflects the letters "paten" and the predictive text shows the words: patent, patency and patens. A new predictive character set of keys 150 is displayed below the virtual keypad 110. This new predictive character set of keys include the letters "c", "s" and "t". The predictive character set of keys 150 replaces the earlier predictive character set of keys 130, and predictive character set of keys 130 are shown for explanation purposes only in this figure.

Figure 5:
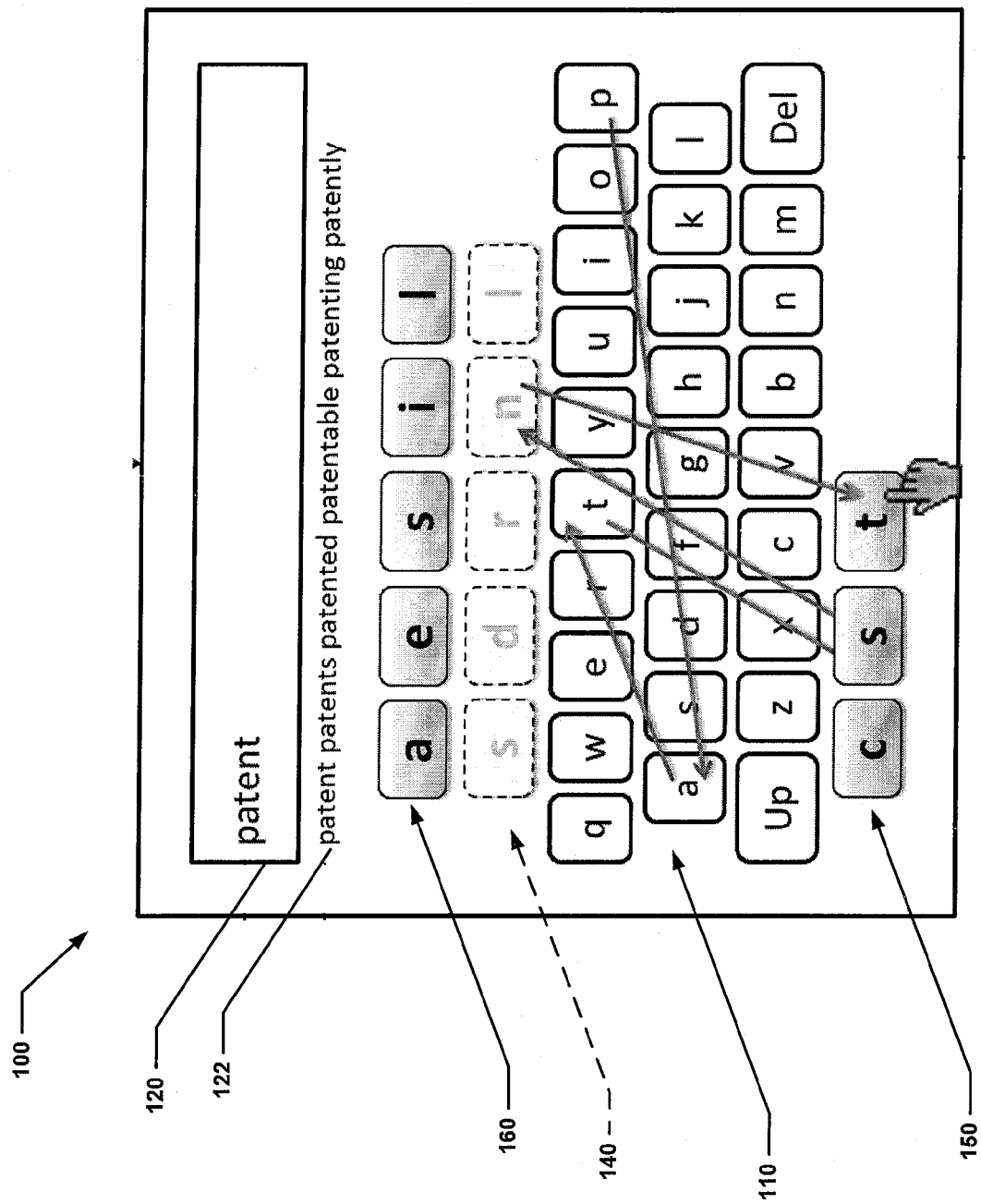
FIG. 5 depicts a virtual keypad and the swype actions required for entering a word wherein a fourth predictive character set of keys which replace a second predictive character set of keys are provided in accordance with embodiments of the invention.

Referring now to FIG. 5, the user has just swiped from "n" of predictive character key to "t" of the new predictive character keys 150. The display of user entered text 120 reflects the letters "patent" and the predictive text shows the words: patent, patents, patented, patentable, patenting and patently. A new predictive character set of keys 160 is displayed above the virtual keypad 110. This new predictive character set of keys include the letters "a", "e", "s", "i" and "l". The predictive character set of keys 160 replaces the earlier predictive character set of keys 140, and predictive character set of keys 140 are shown for explanation purposes only in this figure.

Figure 6:
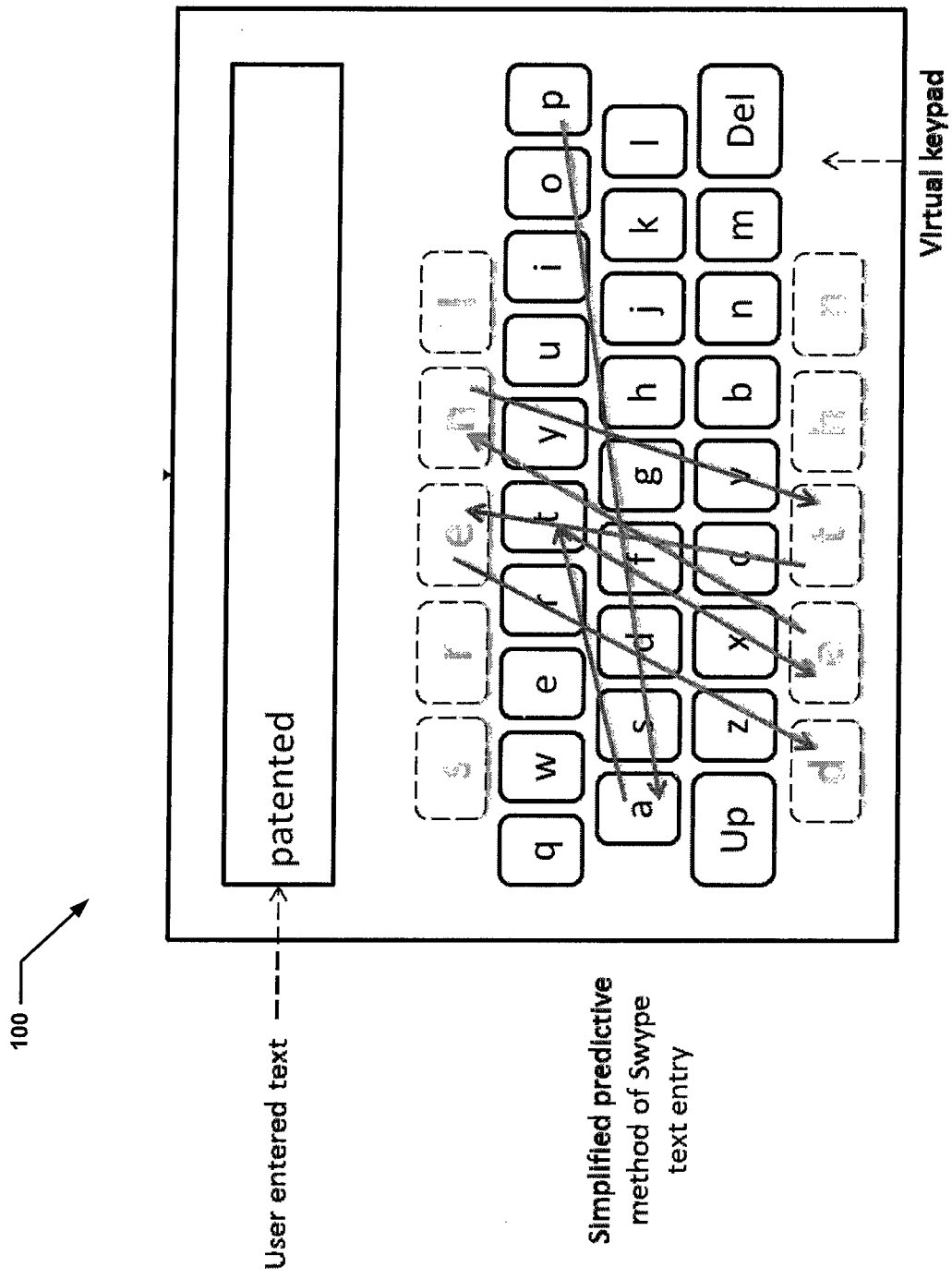
FIG. 6 depicts a virtual keypad and the swype actions required for entering a word in accordance with embodiments of the invention.

Referring now to FIG. 6, the user has just swiped all the letters to form the word "patented". The swiping actions can be summed up as follows. The user touches "p" on the virtual keypad 110, and then swiped to "a" on the virtual keypad 110, then swiped to "t" on the virtual keypad. At this point a first set of predictive character keys was displayed, which allows the user to easily swipe to "e" on the predictive character set of keys rather than the virtual keypad set of keys. The first set of predictive character keys are displayed below the virtual keypad since the previous swiped letter ("t") was in the top row of the virtual keypad. As the user swipes the keys that are part of the predicted set of characters, the system will predict the next set of characters and replace the predicted set at the opposite end of the keypad. This is repeated until the complete word is entered as shown in the user entered text 120.

The presently described method of dynamically changing characters will ensure that the user always has to swipe from one set of predicted characters (either at the top or bottom) to the next set of predicted characters (at the opposite side of the keypad) in a top-bottom-top-bottom fashion introducing a sense of direction and ordering. This method will also reduce the number of touch points (after the initial keyboard swipe required for prediction data) to 14 keys or less (7 at top and 7 at bottom) and will also allow for larger sized keys. At any time during text entry the user retains the ability to swipe through other keys in the virtual keypad if the character he requires is not available in the set of predicted keys.

Figure 7:
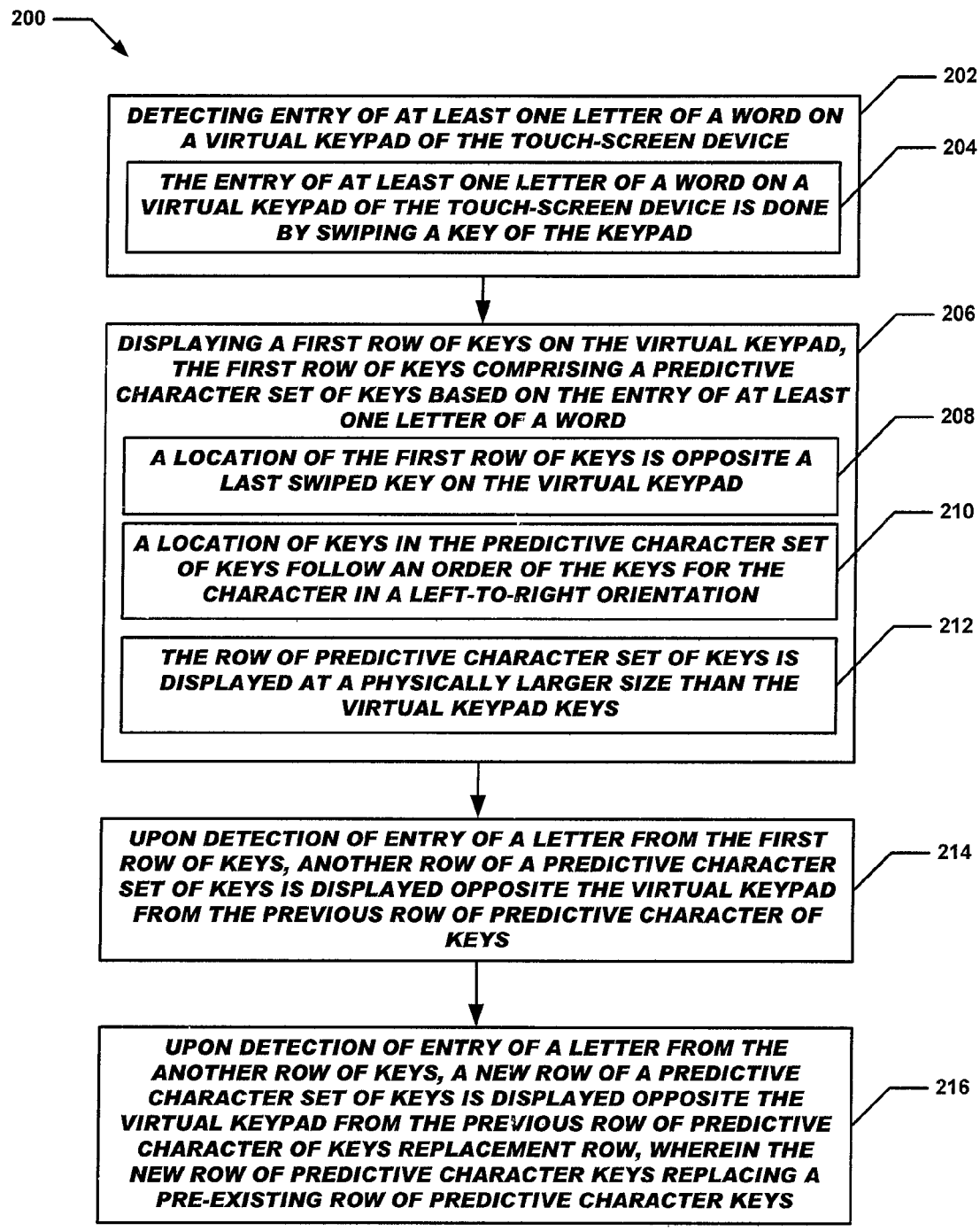
FIG. 7 is a flow diagram of a particular embodiment of a method for simplifying a swype based touch-screen keypad in accordance with embodiments of the invention.

A flow chart of the presently disclosed method is depicted in FIG. 7. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 7, a particular embodiment of a method for simplifying a swype-based touch-screen keypad for text entry is shown. Method 200 begins with processing block 202 which discloses detecting entry of at least one letter of a word on a virtual keypad of the touch-screen device. Processing block 204 states the entry of at least one letter of a word on a virtual keypad of the touch-screen device is done by swiping a key of the keypad.

Processing block 206 recites displaying a first row of keys on the virtual keypad, the first row of keys comprising a predictive character set of keys based on the entry of at least one letter of a word. The predictive character set of keys is based on a best estimate of what the most likely next letter to be enters is. For example if "pat" has been entered, then the predictive character set of keys includes "c", "e", "t", "h", and "i".

Processing block 208 discloses wherein a location of the first row of keys is opposite a last swiped key on the virtual keypad. At any time during text entry the user retains the ability to swipe through other keys in the virtual keypad if the character he requires is not available in the set of predicted keys.

Processing block 210 states wherein a location of keys in the predictive character set of keys follow an order of the keys for the character in a left-to-right orientation. The predictive character set of keys attempts to mimic the layout of the conventional virtual keypad as far as the location of the key characters in order to make selecting a character easier and faster.

Processing block 212 discloses the row of predictive character set of keys is displayed at a physically larger size than the virtual keypad keys. This results in the predictive character set of keys being easier to use than the conventional virtual keypad set of keys, especially for smaller screens such as those on a smart phone type device.

Processing continues with processing block 214 which states upon detection of entry of a letter from the first row of keys, another row of a predictive character set of keys is displayed opposite the virtual keypad from the previous row of predictive character of keys. This results in a top-bottom-top-bottom fashion introducing a sense of direction and ordering.

Processing block 216 discloses upon detection of entry of a letter from the another row of keys, a new row of a predictive character set of keys is displayed opposite the virtual keypad from the previous row of predictive character of keys replacement row, wherein the new row of predictive character keys replacing a pre-existing row of predictive character keys. Preferably only a maximum of two rows of predictive sets of keys are displayed at a time, one above the virtual keypad and one below the virtual keypad.

Figure 8:
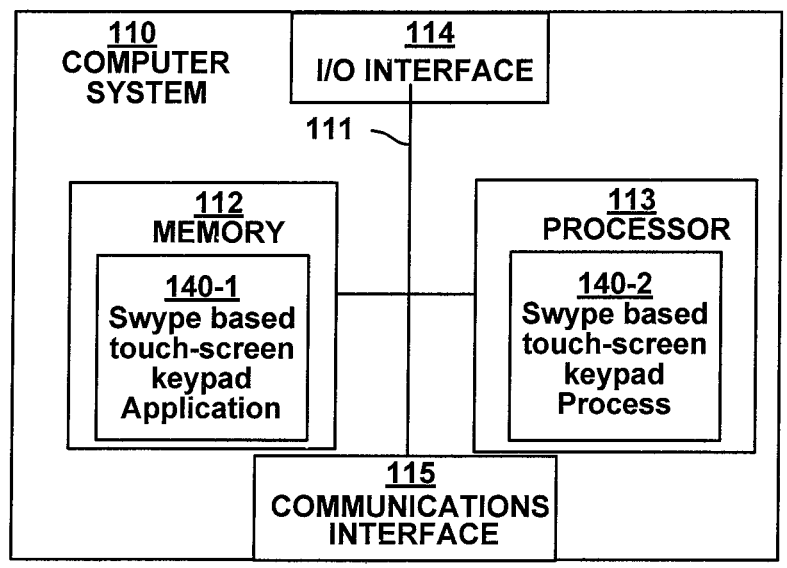
FIG. 8 is a block diagram of a system for simplifying a swype based touch-screen keypad in accordance with embodiments of the invention.

FIG. 8 is a block diagram illustrating example architecture of a computer system 110 that executes, runs, interprets, operates or otherwise performs a swype based touch-screen keypad operating application 140-1 and swype based touch-screen keypad operating process 140-2 suitable for use in explaining example configurations disclosed herein. The computer system 110 may be any type of computerized device such as a personal computer, workstation, video game platform, portable computing device, console, laptop, network terminal, cellular telephone, tablet or the like.

An input device couples to processor and enables a customer 108 to provide input commands, and generally control the graphical customer interface 160 that the swype based touch-screen keypad operating application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a swype based touch-screen keypad operating application 140-1 as explained herein. The swype based touch-screen keypad operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a swype based touch-screen keypad operating application 140-1. Execution of a swype based touch-screen keypad operating application 140-1 in this manner produces processing functionality in the swype based touch-screen keypad operating process 140-2. In other words, the swype based touch-screen keypad operating process 140-2 represents one or more portions or runtime instances of a swype based touch-screen keypad operating application 140-1 (or the entire a swype based touch-screen keypad operating application 140-1) performing or executing within or upon the processor 113 in the computerized device 110 at runtime.

It is noted that example configurations disclosed herein include the swype based touch-screen keypad operating application 140-1 itself (i.e., in the form of un-executed or non-performing logic instructions and/or data). The swype based touch-screen keypad operating application 140-1 may be stored on a computer readable medium (such as a floppy disk), hard disk, electronic, magnetic, optical, or other computer readable medium. A swype based touch-screen keypad operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a swype based touch-screen keypad operating application 140-1 in the processor 113 as the swype based touch-screen keypad operating process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the swype based touch-screen keypad application 140-1. Execution of swype based touch-screen keypad application 140-1 produces processing functionality in swype based touch-screen keypad process 140-2. In other words, the swype based touch-screen keypad process 140-2 represents one or more portions of the swype based touch-screen keypad application 140-1 (or the entire application) performing within or upon the processor 113 in the computer system 100.

It should be noted that, in addition to the swype based touch-screen keypad process 140-2, embodiments herein include the swype based touch-screen keypad application 140-1 itself (i.e., the un-executed or non-performing logic instructions and/or data). The swype based touch-screen keypad application 140-1 can be stored on a computer readable medium such as a floppy disk, hard disk, or optical medium. The swype based touch-screen keypad application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of swype based touch-screen keypad application 140-1 in processor 113 as the swype based touch-screen keypad process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), gaming devices, or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method for entering text on a touch-screen device, comprising:
    detecting entry of at least one letter of a word on a virtual keypad of said touch-screen device; and
    displaying a first row of a predictive character set of keys on said virtual keypad, said predictive character set of keys based on said entry of at least one letter of the word, said predictive character set of keys based on a next character a user is likely to enter as determined by a predictive text entry routine and wherein each key of said predictive character set of keys comprises a single character, wherein a location of said first row of a predictive character set of keys is displayed on an opposite side of said virtual keypad from a last swiped key on said virtual keypad and wherein upon detection of entry of a letter from said first row of a predictive character set of keys, a second row of a predictive character set of keys is displayed on an opposite side of said virtual keypad from said first row of predictive character of keys.

2. The method of claim 1 wherein upon detection of entry of a letter from said second row of a predictive character set of keys, a third row of a predictive character set of keys is displayed opposite said virtual keypad from said second row of predictive character of keys, wherein said third row of predictive character keys replacing a first row of predictive character set of keys.

3. The method of claim 1 wherein said entry of at least one letter of a word on a virtual keypad of said touch-screen device is done by swiping a key of said keypad.

4. The method of claim 1 wherein said row of predictive character set of keys is displayed at a physically larger size than said virtual keypad keys.

5. A non-transitory computer readable storage medium having computer readable code thereon for entering text on a touch-screen device, the medium including instructions in which a computer system performs operations comprising:
    detecting entry of at least one letter of a word on a virtual keypad of said touch-screen device; and
    displaying a first row of a predictive character set of keys on said virtual keypad, said first row of a predictive character set of keys based on said entry of at least one letter of the word, said predictive character set of keys based on a next character a user is likely to enter as determined by a predictive text entry routine and wherein each key of said predictive character set of keys comprises a single character, wherein a location of said first row of a predictive character set of keys is displayed on an opposite side of said virtual keypad from a last swiped key on said virtual keypad and wherein upon detection of entry of a letter from said first row of a predictive character set of keys, a second row of a predictive character set of keys is displayed on an opposite side of said virtual keypad from said first row of predictive character of keys.

6. The method of claim 1 wherein said opposite side of a virtual keypad is either a top side or a bottom side of said virtual keypad, wherein when said swiped key is in a top row then said predictive character set of keys is displayed below a bottom row of said virtual keypad and wherein when said swiped key is in a bottom row then said predictive character set of keys is displayed above a top row of said virtual keypad.

7. The method of claim 1 wherein keys that belong on a right side area of a conventional keypad will appear in a right side area of said predictive set of keys, and wherein keys that belong on a left side area of a conventional keypad will appear in a left side area of said predictive set of keys.

8. The non-transitory computer readable storage medium of claim 7 wherein upon detection of entry of a letter from said second row of a predictive character set of keys, a third row of a predictive character set of keys is displayed opposite said virtual keypad from said second row of predictive character of keys, wherein said third row of predictive character keys replacing a first row of predictive character set of keys.

9. The non-transitory computer readable storage medium of claim 7 wherein said entry of at least one letter of a word on a virtual keypad of said touch-screen device is done by swiping a key of said keypad.

10. The non-transitory computer readable storage medium of claim 7 wherein said row of predictive character set of keys is displayed at a physically larger size than said virtual keypad keys.

11. The computer readable medium of claim 7 wherein said opposite side of a virtual keypad is either a top side or a bottom side of said virtual keypad, wherein when said swiped key is in a top row then said predictive character set of keys is displayed below a bottom row of said virtual keypad and wherein when said swiped key is in a bottom row then said predictive character set of keys is displayed above a top row of said virtual keypad.

12. The computer readable medium of claim 7 wherein keys that belong on a right side area of a conventional keypad will appear in a right side area of said predictive set of keys, and wherein keys that belong on a left side area of a conventional keypad will appear in a left side area of said predictive set of keys.

13. A computer system comprising:
   a memory;
   a processor;
   a communications interface;
   an interconnection mechanism coupling the memory, the processor and the communications interface; and
   wherein the memory is encoded with an application for entering text on a touch-screen device, that when performed on the processor, provides a process for processing information, the process causing the computer system to perform the operations of:
   detecting entry of at least one letter of a word on a virtual keypad of said touch-screen device; and
   displaying a first row of a predictive character set of keys on said virtual keypad, said first row of a predictive character set of based on said entry of at least one letter of the word, said predictive character set of keys based on a next character a user is likely to enter as determined by a predictive text entry routine and wherein each key of said predictive character set of keys comprises a single character, wherein a location of said first row of a predictive character set of keys is displayed on an opposite side of said virtual keypad from a last swiped key on said virtual keypad and wherein upon detection of entry of a letter from said first row of a predictive character set of keys, a second row of a predictive character set of keys is displayed on an opposite side of said virtual keypad from said first row of predictive character of keys.

14. The computer system of claim 13 wherein upon detection of entry of a letter from said second row of a predictive character set of keys, a third row of a predictive character set of keys is displayed opposite said virtual keypad from said second row of predictive character of keys, wherein said third row of predictive character set of keys replacing a first row of predictive character set of keys.

15. The computer system of claim 13 wherein said entry of at least one letter of a word on a virtual keypad of said touch-screen device is done by swiping a key of said keypad.

16. The computer system of claim 13 wherein said row of predictive character set of keys is displayed at a physically larger size than said virtual keypad keys.

17. The computer system of claim 13 wherein said opposite side of a virtual keypad is either a top side or a bottom side of said virtual keypad, wherein when said swiped key is in a top row then said predictive character set of keys is displayed below a bottom row of said virtual keypad and wherein when said swiped key is in a bottom row then said predictive character set of keys is displayed above a top row of said virtual keypad.

18. The computer of claim 13 wherein keys that belong on a right side area of a conventional keypad will appear in a right side area of said predictive set of keys, and wherein keys that belong on a left side area of a conventional keypad will appear in a left side area of said predictive set of keys.

* * * * *